(12) United States Patent
Morgan (10) Patent No.: US 9,218,239 B2
(45) Date of Patent: Dec. 22, 2015

(54) APPARATUSES AND METHODS FOR ERROR CORRECTION

(71) Applicant: Micron Technology, Inc., Boise, ID (US)

(72) Inventor: Donald M. Morgan, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 271 days.

(21) Appl. No.: 13/917,431

(22) Filed: Jun. 13, 2013

(65) Prior Publication Data
US 2014/0372830 A1 Dec. 18, 2014

(51) Int. Cl.
*G06F 11/10* (2006.01)

(52) U.S. Cl.
CPC .................... *G06F 11/10* (2013.01)

(58) Field of Classification Search
CPC ...... G06F 11/10; H03M 13/09; H03M 13/098
USPC .......................... 714/801, 858, 707
See application file for complete search history.

(56) References Cited

U.S. PATENT DOCUMENTS

| | | | |
|---|---|---|---|
| 5,923,680 A * | 7/1999 | Brueckheimer et al. | 714/758 |
| 6,748,567 B1 * | 6/2004 | Ornes et al. | 714/785 |
| 8,345,501 B2 | 1/2013 | Jeong | |
| 8,347,165 B2 | 1/2013 | Johnson | |

OTHER PUBLICATIONS

Ferretti and Beerel, "Single-Track Asynchronous Pipeline Templates Using 1-of-N Encoding," IEEE Design, Automation and Test in Europe Conference and Exhibition, 2002, 8 pages.
Ferretti and Beerel, "High Performance Asynchronous Design Using Singe-Track Full-Buffer Standard Cells," IEEE Journal of Solid State Circuits, vol. 41, No. 6, Jun. 2006, pp. 1444-1454.

* cited by examiner

*Primary Examiner* — Guy Lamarre
(74) *Attorney, Agent, or Firm* — Knobbe, Martens, Olson & Bear, LLP (57) ABSTRACT

This disclosure relates to error correction circuitry. In one aspect, an error correction circuit can serially receive a digit stream and parse the digit stream into substrings of a predetermined length of digits. Each of the substrings can include data digits and parity digits in certain embodiments. As the substring is received, parity can be tracked in defined regions of the substring. When the entire substring has been received, an error in one of the data digits of the substring can be corrected based on an indication of parity in at least one defined region in some embodiments. Then corrected data, which can include the corrected data digit and the other data digits of the substring, can be stored. According to certain embodiments, the error correction circuit can be implemented by asynchronous circuitry.

32 Claims, 5 Drawing Sheets

| FIG. 4-1 | FIG. 4-2 |

APPARATUSES AND METHODS FOR ERROR CORRECTION

BACKGROUND

1. Technical Field

Embodiments of the invention generally relate to electronics, and, in particular, to error correction circuits and/or asynchronous circuits.

2. Description of the Related Technology

Error correction codes (ECC) are widely used to detect and/or correct errors in data read from a memory, such as a non-volatile memory (NVM). Parity is a common ECC protection scheme. Data digits, such as bits having binary values, and their corresponding parity digits can be referred to as a codeword.

A Hamming code is one example of an error correction code. Hamming codes use parity digits that correspond to overlapping parity regions of data digits of a codeword, such that a position of a single error in the codeword can be uniquely identified. In addition, some Hamming codes can include an overall parity digit. In one non-limiting example, with an overall parity digit in a particular Hamming code, one error in a codeword can be corrected and two errors in the codeword can be detected. As such, this type of Hamming code can provide single error correction, double error detection (SECDED) data protection.

Error correction circuits can be susceptible to process, voltage, and temperature (PVT) variations. Alternatively or additionally, error correction circuits can require a relatively large amount of circuitry to implement, which can increase die area and costs. Further, some error correction circuits require external controls and/or clocks that consume significant power and/or add complexity to the design. Accordingly, a need exists for improved error correction circuits.

BRIEF DESCRIPTION OF THE DRAWINGS

These drawings and the associated description herein are provided to illustrate specific embodiments of the invention and are not intended to be limiting.

FIG. 4, which includes FIG. 4-1 and FIG. 4-2, is a schematic diagram of an illustrative parity circuit that can be used in the error correction circuit of FIG. 1 according to an embodiment.

To avoid repetition of description, components having the same or similar function may be referenced by the same reference number.

DETAILED DESCRIPTION OF CERTAIN EMBODIMENTS

Although particular embodiments are described herein, other embodiments, including embodiments that do not provide all of the benefits and features set forth herein, will be apparent to those of ordinary skill in the art.

Generally described, aspects of this disclosure relate to correcting errors in data read from memory. An error correction circuit can receive a digit stream having an indefinite length of digits. The digit stream can include consecutive substrings of a predetermined length of digits. Each of the substrings can include data digits and parity digits. For instance, the substring can be a codeword that includes Hamming parity information. While some embodiments are described with reference to Hamming codes, it will be understood that the principles and advantages described herein can be applied to other error correction codes, such as Bose Chaudhuri Hocquenghem (BCH) codes and the like. Moreover, while some embodiments are described with reference to error correction codes decoding for illustrative purposes, it will be understood that the principles and advantages described herein can be applied to error correction codes encoding. The error correction circuit can parse the data stream into substrings. For example, the error correction circuit can load the substring into a register and then halt the loading of the digit stream into the register when the register stores the full substring. The error correction circuit can correct an error in the substring. For instance, the error correction circuit can track parity in regions of the substring and generate indications of parity corresponding the each of the regions. By decoding the indications of parity, a location of an error in the substring can be determined. Then, according to certain embodiments, the inverse data value can be provided for the erroneous data digit. The corrected data, which can include the corrected data digit and the other data digits of the substring, can be provided to the computer storage. In certain embodiments, the error correction circuit can be implemented without an external clock and/or external control signals. As one example, the error correction circuit can be an asynchronous circuit. Such an asynchronous circuit can be implemented, for example, by using a library of asynchronous logic having connections configured by antifuse technology.

The error correction described herein can be tolerant to a relatively wide variety of PVT variations. For example, asynchronous circuits as described herein can correctly function in the presence of a relatively wide range of PVT variations. When implemented with asynchronous circuitry, the error correction circuit should function correctly under a range of conditions that could otherwise violate setup and/or hold time requirements of a clocked error correction circuit.

The error correction described herein can also consume less power than some previous error correction schemes. Without a clock signal, power can be reduced relative to clocked circuits when appropriately sized asynchronous circuitry is used. Less power can be consumed with asynchronous circuitry compared to clocked circuit for a given processing speed.

While some existing error correction circuitry consumes significant die area to achieve performance metrics, the error correction circuits described herein can consume less die area than some previous designs and consequently reduce costs.

According to certain embodiments, the error correction described herein can be implemented from known templates of asynchronous pipeline logic. As one example, the asynchronous error correction circuits of FIGS. 1, 3, and 4 can be implemented by Single-Track Full Buffer (STFB) logic. As another example, the asynchronous error correction circuits of FIGS. 1, 3, and 4 can be implemented by MOUSETRAP asynchronous logic. Using known asynchronous template logic to implement the error correction described herein can simply overall design. Alternatively or additionally, using known asynchronous template logic to implement the error correction described herein can simplify higher level integration of different functionalities of an error correction circuit.

Figure 1:
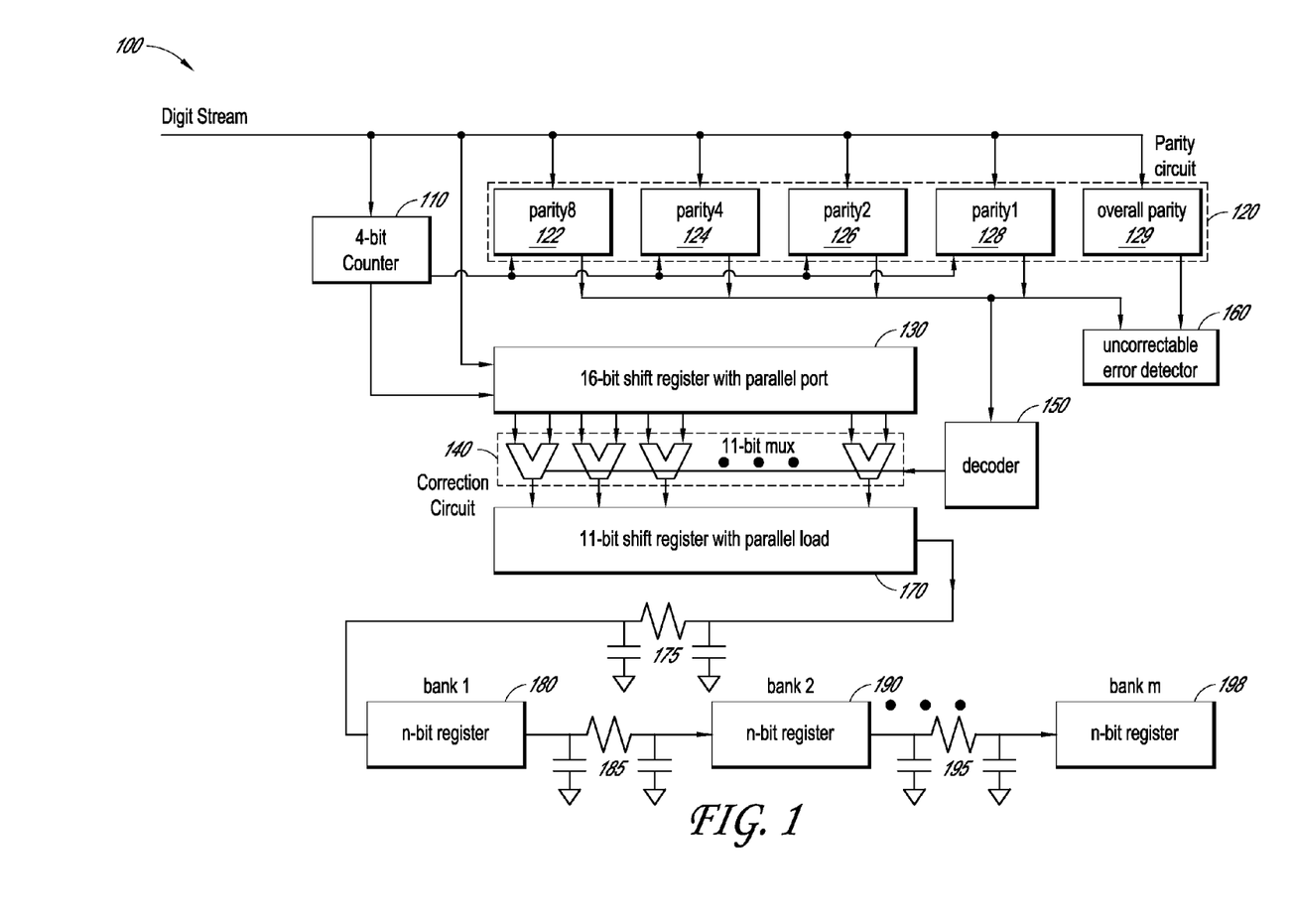
FIG. 1 is a schematic block diagram of an illustrative error correction circuit according to an embodiment.

FIG. 1 is a schematic block diagram of an illustrative error correction circuit 100 according to an embodiment. While illustrated in the context of binary logic and binary digits (bits), other units of digits can be used. As illustrated, the error correction circuit 100 includes a counter circuit 110, a parity circuit 120, an input register 130, a correction circuit 140, a decoder 150, an uncorrectable error detection circuit 160, and an output register 170. It will be understood that the error correction circuit 100 can include more or less circuitry than illustrated in FIG. 1. Moreover, while certain circuits are described based on their separate functionality, it will be understood that two or more of the circuits shown in FIG. 1 can be integrated together to form a single block and/or to share electronic hardware.

The error correction circuit 100 is configured to receive an input digit stream, such as a bit stream. For instance, the error correction circuit 100 can receive the digit stream from an NVM. The error correction circuit 100 is configured to process a digit stream that includes consecutive substrings each having a predetermined length. Each of the substrings includes data digits and parity digits. For example, the error correction circuit 100 illustrated in FIG. 1 is configured to process a digit stream with 16 bit substrings, in which each substring includes 11 data bits and 5 parity bits. In this example, the substring can form a (16, 11) Hamming code with SECDED data protection. While 16 digit substrings are described herein for illustrative purposes, it will be understood that substrings of a variety of other lengths can be processed in accordance with the principles and advantages discussed herein. For instance, in another example, the digit stream can include consecutive substrings of 32 binary digits (bits) each, with each of the substrings including 26 data bits and 6 parity bits, of which 5 correspond to overlapping parity bits and one is an overall parity bit. The input digit stream can be provided to the counter circuit 110, the parity circuit 120, and the input register 130.

The digit stream can be processed using STFB asynchronous pipeline templates in various embodiments. STFB circuits typically include 1-of-N dual rail encoding that uses a single track for data and handshaking. STFB asynchronous pipeline templates can be configured with dual rail encoding, for example. Dual rail encoding can refer to using two separate signal lines for binary values, in which one of the two signal lines is asserted to transmit a binary value. The asserted signal line can then be reset to indicate that there is no data (or a spacer state) before the next data value is transmitted and/or received.

According to some embodiments, some or all of the error correction circuit 100 is implemented using STFB circuitry. The lack of bundling constraints can make using and/or verifying STFB circuits relatively easy. The template based approach of STFB design allows development of small blocks which integrate well at a higher level. This can simplify overall design. STFB templates can identify data input as a left environment and data output as a right environment according to some implementations. Since distinct tokens can simultaneously be at the left and right environments, the template is typically considered to be a full buffer with slack of one. Each stage of STFB logic can consume and store one bit of data. Another bit is typically not processed until the succeeding stage has consumed the first bit.

The input register 130 is configured to serially receive the digit stream. As illustrated, the input register 130 is a shift register. Each digit of the digit stream can be shifted through the input register 130 until the input register is full. Then the input register 130 can halt receiving digits of the digit stream. In one embodiment, when the input register 130 is configured to process dual rail encoded digits, the input register 130 can detect that an entire substring is stored therein based on the last digit of the input register 130 having one of the dual rail encoded signal lines asserted. According to another embodiment, the counter circuit 110 can control the halting of the input register 130. In this embodiment, the input register 130 can halt receiving data digits based on one or more outputs of the counter circuit 110 indicating that an entire substring has been received. For instance, when the counter circuit 110 has reached a maximum count value and/or incremented/decremented its output the same number of times as the predetermined number of digits, the input register 130 can halt receiving data digits. In one embodiment, the counter circuit 110 controls the halting of the input register 130.

The counter circuit 110 and/or the parity circuit 120 can also halt receiving the digit stream when the input register 130 halts receiving the digit stream. In one embodiment, the digit stream can be provided to the counter circuit 110 and/or the parity circuit 120 via the input register 130. This is one way to have the counter circuit 110 and/or the parity circuit 120 halt receiving the digit stream when the input register 130 halts receiving the digit stream.

The input register 130 can store a number of digits equal to the length of a substring of the digit stream. For instance, in FIG. 1, the input register can store 16 bits since the digit stream includes substrings of 16 bits each. The input register 130 can include parallel read ports. Accordingly, each of the digits stored by the input register 130 can be provided to the correction circuit 140 in parallel.

As the digit stream is received, the counter circuit 110 can update (for example, increment) its output each time a digit of the digit stream is received. Since the same digit stream can be received by both the counter circuit 110 and the input register 130, the counter circuit 110 can increment its output each time the input register 130 receives a digit of the digit stream. Although the counter circuit 110 may be described with reference to increasing a count value for illustrative purposes, it will be understood that the principles and advantages discussed herein can be applied to counter circuits that are configured to decrease a count value.

The counter circuit 110 can have an output with different values corresponding to each digit in a substring of the digit stream being received by the error correction circuit 100. In the example of FIG. 1, the counter circuit 110 is a 4-bit counter with a 4-bit output that can represent 16 different output values. Accordingly, the counter circuit 110 can generate a different output as each digit of the 16 bit substring is received. As another example, a 5-bit counter can be implemented in an error correction circuit configured to process 32 bit substrings. The counter circuit 110 can be an asynchronous counter, such as the counter circuit 110 of FIG. 3.

Figure 3:
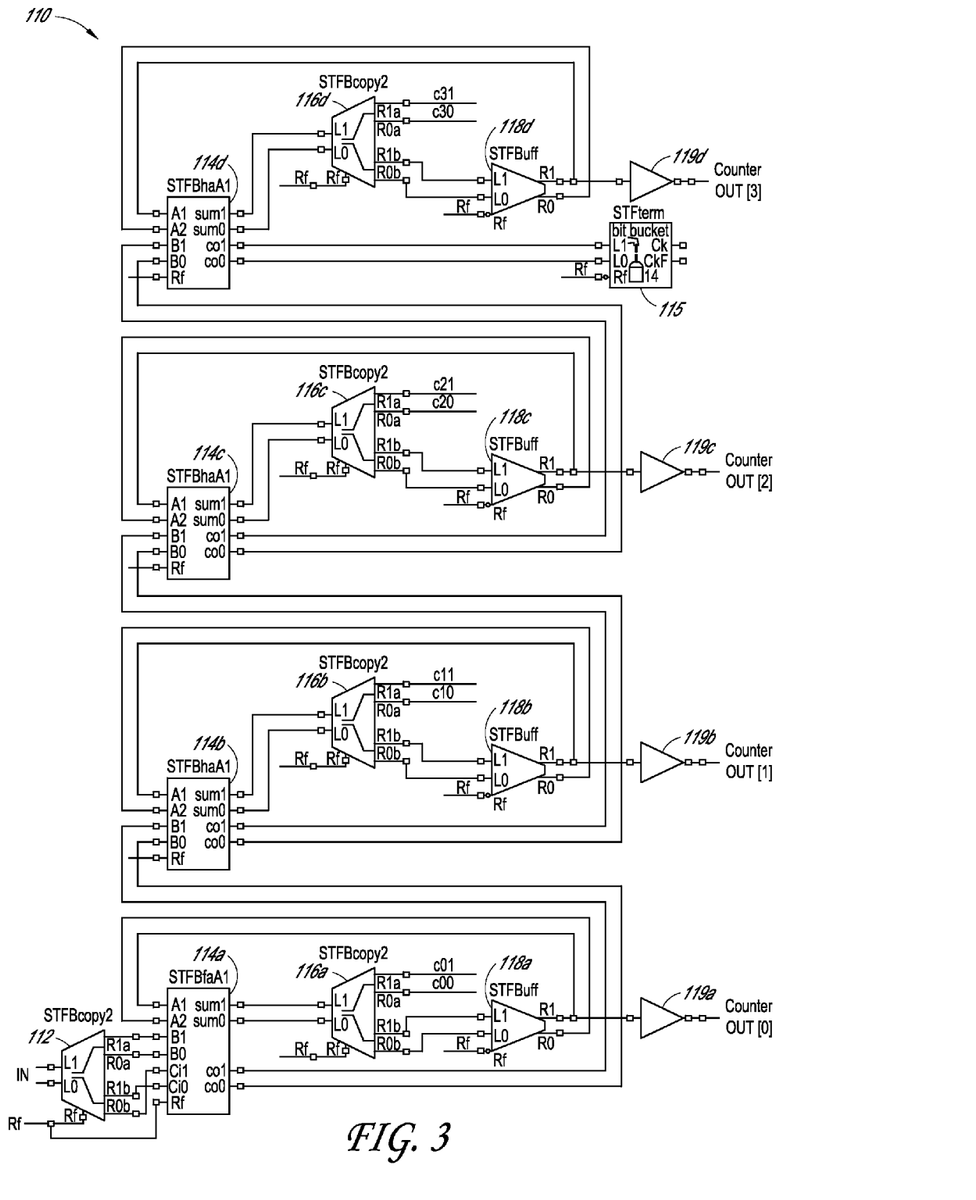
FIG. 3 is a schematic diagram of an illustrative asynchronous counter circuit that can be used in the error correction circuit of FIG. 1 according to an embodiment.

FIG. 3 is a schematic diagram of an illustrative asynchronous counter circuit 110 that can be used in the error correction circuit of FIG. 1 according to an embodiment. The asynchronous counter circuit 110 can alternatively be used in a variety of other application. While the asynchronous counter circuit 110 illustrated in FIG. 3 is implemented by STFB asynchronous pipeline logic, it will be understood that the counter circuit 110 can be implemented with other suitable asynchronous circuitry in accordance with the principles and advantages discussed herein. The counter circuit 110 can be implemented with adders. A string of adders can increment a count value by adding 1 to a previous value. In one embodiment, the counter can be preset to a maximum count value, such as a counter output of all logic 1s for a binary counter, so that the first count can be 0. Since a preset or last value should satisfy only one adder input, each adder stage in the counter circuit 110 should wait for the other(s) to complete before adding its inputs. This can result in a new adder input being provided before another addition operation occurs.

The counter circuit 110 can receive an input digit IN of the digit stream. The input digit IN to the counter circuit 110 can be dual rail encoded. The input can be copied by a copy block 112 to provide two copies of the input digit IN. This can maintain a fan out of about 1, which can be advantageous for asynchronous pipeline logic. The copy block 112 can provide a copy of the input digit IN to a first adder 114a and another copy of the input IN to the first adder 114a with the data inverted between the signal lines for the dual rail encoded data. Such inversion can be implemented by "twisting" the signal lines of the copy block 112 and the first adder 114a, that is, by connecting the non-inverted output to an inverted input, and an inverted output to a non-inverted input. By receiving the input digit and the inverse of the input digit, the first adder 114a can receive a logic 1 value each time a digit of the digit stream is received for dual rail encoded data.

The first adder 114a can be a full adder. The first adder 114a can increment its outputs each time an input digit is received. By receiving the input digit and the inverse of the input digit of dual rail encoded data, the first adder 114a can increment its output each time a digit of the digit stream is received. As illustrated, the first adder 114a adds 1+0+ to the last output of the first adder 114a. A sum output of the first adder 114a can be provided to a copy block 116a. The copy block 116a can generate multiple outputs from a single input so that a fan out of about 1 can be maintained in the asynchronous pipeline logic. The copy block 116a can provide an output c01, 00, which is indicative of the sum output of the first adder 114a, to the regional parity circuit 128 of FIG. 4. Since the output c01, c00 is provided to the parity circuit 120, the output c01, c00 is an output of the counter circuit 110. The copy block 116a can provide another output indicative of the sum output of the first adder 114a to a buffer 118a. The buffer 118a can provide data to an input of the first adder 114a to be added when the next input digit IN is received. In addition, the buffer 118a can provide data to an output driver 119a. The output driver 119a can drive the least significant digit of the counter output COUNTER OUT[0], which can be used in determining a maximum count of the counter circuit 110.

A carry output of the first adder 114a can be provided to a second adder 114b. As illustrated, the second adder 114b can be a half adder. The second adder 114b can increment its outputs each time the carry output of the first adder 114a is asserted. As illustrated, the second adder 114b adds its sum output with the carry output of the first adder 114a. A sum output of the second adder 114b can be provided to a copy block 116b. The copy block 116b can provide an output c11, c10, which is indicative of the sum output of the second adder 114b, to the regional parity circuit 126 of FIG. 4. Since the output c11, c10 is provided to the parity circuit 120, the output c11, c10 is an output of the counter circuit 110. The copy block 116b can provide another output indicative of the sum output of the second adder 114b to a buffer 118b. The buffer 118b can provide data to an input of the second adder 114b to be added when the carry output of the first adder 114a is next asserted. In addition the buffer 118b can provide data to an output driver 119b. The output driver 119b can drive the second least significant digit of the counter output COUNTER OUT[1], which can be used in determining a maximum count of the counter circuit 110.

A carry output of the second adder 114b can be provided to a third adder 114c. As illustrated, the third adder 114c can be a half adder. The third adder 114c can increment its outputs each time the carry output of the second adder 114b is asserted. As illustrated, the third adder 114c adds its sum output with the carry output of the second adder 114b. A sum output of the third adder 114c can be provided to a copy block 116c. The copy block 116c can provide an output c21, c20, which is indicative of the sum output of the third adder 114c, to the regional parity circuit 124 of FIG. 4. Since the output c21, c20 is provided to the parity circuit 120, the output c21, c20 is an output of the counter circuit 110. The copy block 116c can provide another output indicative of the sum output of the third adder 114c to a buffer 118c. The buffer 118c can provide data to an input of the third adder 114c to be added when the carry output of the second adder 114b is next asserted. In addition the buffer 118c can provide data to an output driver 119c. The output driver 119c can drive the third least significant digit of the counter output COUNTER OUT [2], which can be used in determining a maximum count of the counter circuit 110.

A carry output of the third adder 114c can be provided to a fourth adder 114d. As illustrated, the fourth adder 114d can be a half adder. The fourth adder 114d can increment its outputs each time the carry output of the third adder 114c is asserted. As illustrated, the fourth adder 114d adds its sum output with the carry output of the third adder 114c. A sum output of the fourth adder 114d can be provided to a copy block 116d. The copy block 116d can provide an output c31, c30, which is indicative of the sum output of the fourth adder 114d, to the regional parity circuit 122. Since the output c31, c30 is provided to the parity circuit 120, the output c31, c30 is an output of the counter circuit 110. The copy block 116d can provide and another output indicative of the sum output of the fourth adder 114d to a buffer 118d. The buffer 118d can provide data to an input of the fourth adder 114d to be added when the carry output of the third adder 114c is next asserted. In addition, the buffer 118d can provide data to an output driver 119d. The output driver 119d can drive the fourth least significant digit of the counter output COUNTER OUT[3], which can be used, for example, in determining a maximum count of the counter circuit 110. The carry output of the fourth adder 114d is connected to a bit bucket 115. The bit bucket 115 can provide an acknowledgment that the carry result is consumed so that the fourth adder 114d may continue to operate without waiting. The counter output COUNTER OUT[3:0 ] can be combined to determine that counter circuit 110 has reached a maximum counter output value. This can provide an indication to the input register 130 that a full substring has been received.

Additional adders and corresponding circuitry can be included to implement counters having different count outputs in accordance with the principles and advantages discussed herein.

Referring back to FIG. 1, the output of the counter circuit 110 can be provided to the parity circuit 120. The parity circuit 120 can also receive the digit stream. The parity circuit 120 can determine parity of defined regions of a substring of the digit stream and generate indications of parity of the defined regions of the substring. The parity circuit 120 can be included in a pipelined architecture, such as an asynchronous pipelined architecture. When the pipelined is advanced, the parity circuit can incrementally generate parity information with new information from the digit stream.

An indication of parity of a defined region of the substring can have different values when the corresponding digits of the substring have an odd number of a particular value compared to when the corresponding digits of the substring have an even number of the particular value. For instance, when a defined region of the substring has an odd number of digits having a logic 1 value, its indication of parity generated by the parity circuit 120 can have an inverse value compared to when the defined region of the substring has an even number of digits having a logic 1 value. It will be understood that the parity of logic 0 values can alternatively or additionally be tracked by the parity circuit 120. The parity circuit 120 can be an asynchronous parity circuit, such as the parity circuit 120 described later in connection with FIG. 4.

The defined regions of the substring can correspond to respective parity digits of a substring. Two or more of these defined regions can overlap. In the example error correction circuit 100 of FIG. 1, the substring includes 5 parity digits of a Hamming code. When the substring includes a Hamming code, the defined parity regions can correspond to regions for which parity digits of the Hamming code provide parity information. The parity digits can be generated (for example, by an ECC encoder) such that values of the parity digits make a corresponding region of the substring have a selected parity, such as an even parity or an odd parity. For example, if the data digits of a defined region have an odd parity and the selected parity is even, the corresponding parity digit can be generated with a value (for example, logic 1 in a binary implementation) to make the parity of the data digits plus the parity digit have an even parity. In this example, if the data digits of a defined region have an even parity and the selected parity is even, the corresponding parity digit can be generated with a value (for example, logic 0 in a binary implementation) to make the parity of the data digits plus the parity digit have an even parity.

The parity circuit 120 can determine parity of the defined regions of the substring based on an output of the counter circuit 110 and values of digits of the substring corresponding to the defined regions. For instance, Table 1 below summarizes an illustrative example of counter outputs corresponding to each digit of a 16 digit substring being received and to respective defined regions of the substring. In Table 1, an 'x' denotes that a particular binary counter output corresponds to a defined region. In this example, defined parity region 1 corresponds to counter outputs in which the least significant digit has a logic 1 value, defined parity region 2 corresponds to counter outputs in which the second least significant digit has a logic 1 value, defined parity region 3 corresponds to counter outputs in which the third least significant digit has a logic 1 value, and defined parity region 4 corresponds to counter outputs in which the most significant digit has a logic 1 value.

TABLE 1

| Counter Output | | | | Defined Parity Regions | | | |
|---|---|---|---|---|---|---|---|
| | | | | 1 | 2 | 3 | 4 |
| 0 | 0 | 0 | 0 | | | | |
| 0 | 0 | 0 | 1 | x | | | |
| 0 | 0 | 1 | 0 | | x | | |
| 0 | 0 | 1 | 1 | x | x | | |
| 0 | 1 | 0 | 0 | | | x | |
| 0 | 1 | 0 | 1 | x | | x | |
| 0 | 1 | 1 | 0 | | x | x | |
| 0 | 1 | 1 | 1 | x | x | x | |
| 1 | 0 | 0 | 0 | | | | x |
| 1 | 0 | 0 | 1 | x | | | x |

TABLE 1-continued

| Counter Output | | | | Defined Parity Regions | | | |
|---|---|---|---|---|---|---|---|
| | | | | 1 | 2 | 3 | 4 |
| 1 | 0 | 1 | 0 | | x | | x |
| 1 | 0 | 1 | 1 | x | x | | x |
| 1 | 1 | 0 | 0 | | | x | x |
| 1 | 1 | 0 | 1 | x | | x | x |
| 1 | 1 | 1 | 0 | | x | x | x |
| 1 | 1 | 1 | 1 | x | x | x | x |

Table 2 below summarizes an illustrative example of positions of parity digits and data digits in a 16 digit substring. In Table 2, digits P8, P4, P2, P1, and P0 are parity digits and digits D0 to D11 are data digits. Parity digit P1 corresponds to parity region 1 in Table 1, parity digit P2 corresponds to parity region 2 in Table 1, parity digit P4 corresponds to parity region 3 in Table 1, and parity digit P8 corresponds to parity region 4 in Table 1. Thus, parity digits P8, P4, P2, P1 can be referred to as regional parity digits. Parity digit P0 is an overall parity bit. Each of the parity bits P8, P4, P2, and P1 is included in only one defined of the four defined regions corresponding to Table 1. The overall parity bit P0 is not included in any of the four defined parity regions corresponding to Table 1.

TABLE 2

| | Digit Position | | | | | | | | | | | | | | | |
|---|---|---|---|---|---|---|---|---|---|---|---|---|---|---|---|---|
| | 15 | 14 | 13 | 12 | 11 | 10 | 9 | 8 | 7 | 6 | 5 | 4 | 3 | 2 | 1 | 0 |
| Digit | D10 | D9 | D8 | D7 | D6 | D5 | D4 | P8 | D3 | D2 | D1 | P4 | D0 | P2 | P1 | P0 |

The parity circuit 120 can include a plurality of parity region circuits of a first type and a parity region circuit of a second type. The plurality of parity region circuits of the first type can include parity region circuits 122, 124, 126, 128, that each track parity in a defined region of the substring. The parity region circuit of the second type can include an overall parity circuit 129 for tracking overall parity of the substring. In one embodiment, the parity region circuits 122, 124, 126, 128 each comprise at least an AND gate and a T flip-flop, and the overall parity circuit 129 comprises at least a T flip-flop. An AND gate of each of the parity region circuits 122, 124, 126, and 128 can receive a digit of the output from the counter circuit 110. For example, with the counter circuit 110 having 4 bits lines designated COUNTER[3:0], a most significant bit c31, c30 which is the dual rail encoded copy corresponding to COUNTER[3] can be provided as an input to the AND gate of the parity region circuit 122, a bit c21, c20 which is the dual rail encoded copy corresponding to COUNTER[2] can be provided as an input to the AND gate of the parity region circuit 124, a bit c11, c10 which is the dual rail encoded copy corresponding to COUNTER[1] can be provided as an input to the AND gate of the parity region circuit 126, and a least significant bit c01, c00 which is the dual rail encoded copy corresponding to COUNTER[0] can be provided as an input to the AND gate of the parity region circuit 128. The other inputs of the AND gates are configured to receive the current bit of the input data stream. The output of the AND gates are provided as inputs to toggle the state of the T flip-flops such that a parity region circuits 122, 124, 126, 128 toggles its state when the input data stream is a logic 1 and the corresponding line from the counter circuit 110 is also a logic 1. The overall parity circuit 129 can toggle its state when the input data stream is a logic 1. In alternative embodiments, other types of combinatorial logic gates other than an AND gate can be used with appropriate other circuit modifications. Accordingly, the parity region circuits 122, 124, 126, and 128 can update their respective outputs when the counter output corresponds to a respective defined region of a corresponding parity region circuit.

In another example, when the received counter output digit of a parity region circuit has a particular value (for example, a logic 1 value) and the received digit of the substring has a selected value (for example, a logic 1 value), the output of the parity region circuit can toggle. As such, the parity region circuits 122, 124, 126, and 128 can track the parity of defined regions of the substring. In some embodiments, an overall parity circuit 129 can track the overall parity of the substring. This can help to implement SECDED data protection in connection with an overall parity digit. As such, one of the defined regions can correspond to the entire substring. More details regarding an example parity circuit 120 will be described in connection with FIG. 4.

Figure 4:
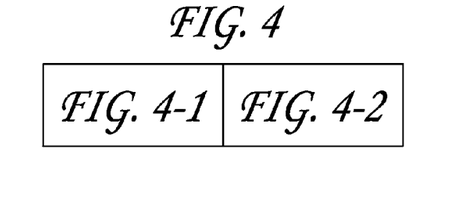
Figure 41:
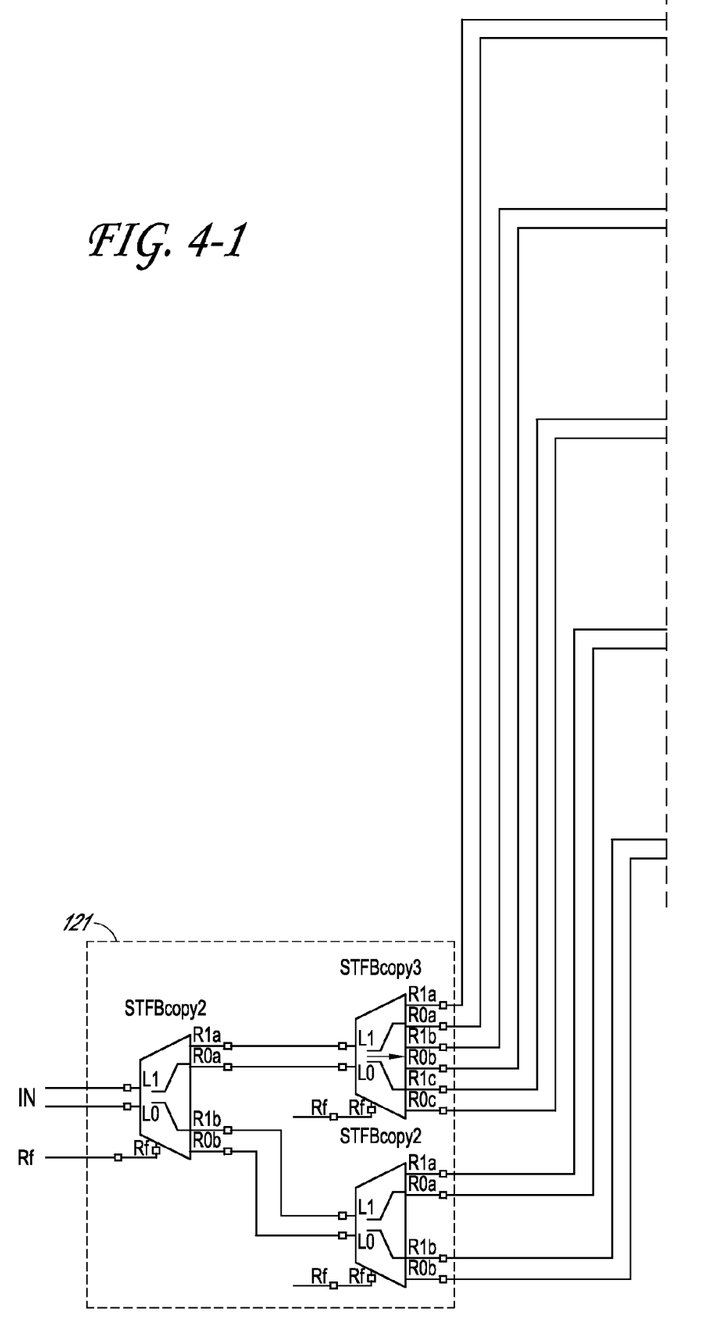
Figure 42:
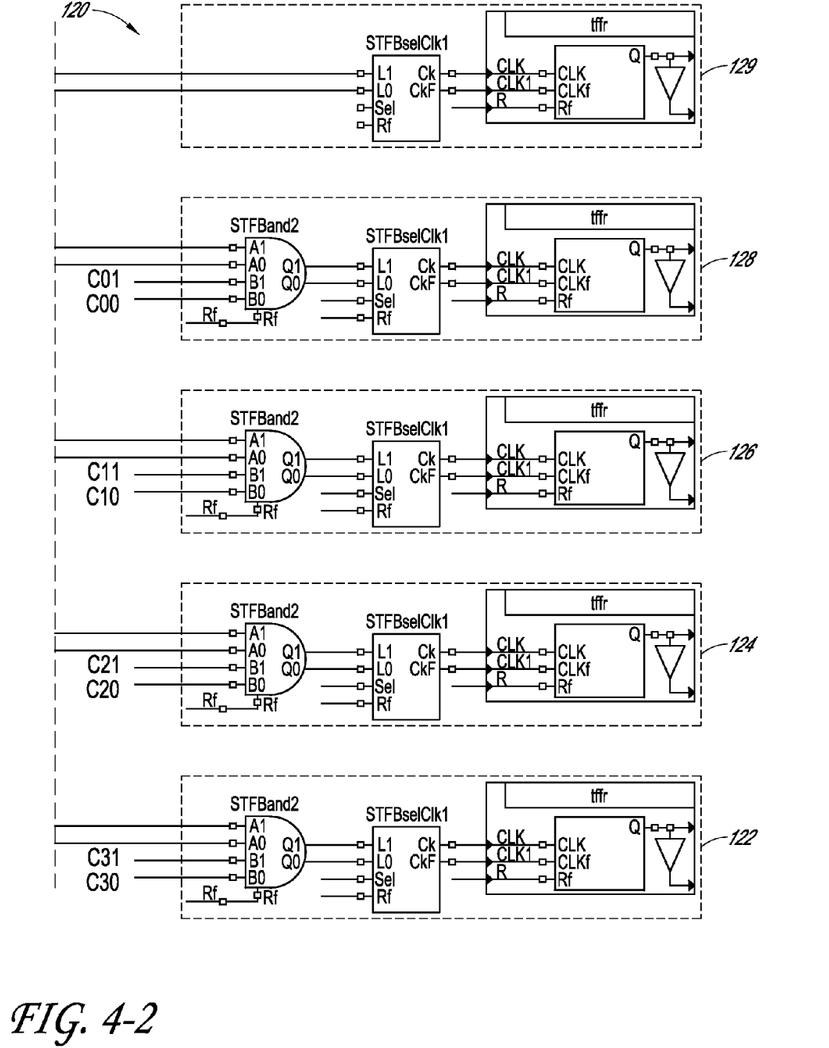

FIG. 4, which includes FIG. 4-1 and FIG. 4-2, is a schematic diagram of an illustrative parity circuit 120 that can be used in the error correction circuit of FIG. 1 according to an embodiment. While illustrated in the context of binary digits or bits, the principles and advantages can be applied to other units of digits. Although the parity circuit 120 illustrated in FIG. 4 is implemented by STFB asynchronous pipeline logic, it will be understood that the parity circuit can be implemented with other suitable asynchronous circuitry in accordance with the principles and advantages discussed herein. The parity circuit 120 can initialize and/or reset all indications of parity to a predefined value, such as 0. Each defined parity region of a substring received by the error correction circuit 100 can be tracked by a T flip-flop, for example. In the overall parity circuit 129 configured to track overall parity of the substring, an output indication of parity can toggle each time an input digit IN of the digit stream is received having a selected value, such as a logic 1 value. The indications of parity for the other defined parity regions can toggle based on a combination of a count output digit of the counter circuit 110 having a particular value, such as a logic 1, and the value of the input digit IN having a selected value, such as a logic 1.

As shown in FIG. 4, the input digit IN can be copied by a copy circuit 121 to provide a copy of the input digit to each of the parity region circuits 122, 124, 126, 128 and to the overall parity circuit 129. This can maintain a fan out of about 1, which can be advantageous in an asynchronous circuit. The copy circuit 121 can have more than one stage to generate copies of the input digit. For instance, the copy circuit 121 illustrated in FIG. 4 has two stages to provide five copies of the input digit to the parity region circuits 122, 124, 126, 128 and to the overall parity circuit 129.

The overall parity circuit 129 can toggle each time a digit of the substring having a particular value is received. For instance, the overall parity circuit 129 can toggle its output each time a digit of the substring has a value of logic 1 to track the parity of the logic 1 s of the substring. The overall parity circuit 129 can be implemented with a select clock circuit and a T flip-flop. The select clock circuit can consume data and generate a pulse upon on receipt of a selected value, such as a logic 1, when selected. The pulse can be, for example, 5 gate wide pulse. The output of the clock select circuit can be provided to the T flip-flop. A T flip-flop can toggle (i.e., change state) whenever a clock input is strobed. The T flip-flop can hold its state except on a transition, such as a rising edge, of the clock input.

The parity region circuits 122, 124, 126, and 128 can toggle based on a received digit of the substring having a selected value and a counter output digit having a particular value. For instance, the parity region circuit 122 can toggle its output each time a digit of the substring has a value of logic 1 and the least significant counter output digit c01, c00 which is the dual rail encoded copy corresponding to COUNTER OUT[0] also has a value of logic 1. This can track the parity in the defined parity region 1 discussed above. As illustrated in FIG. 4, the parity region circuit 122 can include an AND gate configured to perform a logical AND function on the input digit and the least significant counter output digit corresponding to COUNTER OUT[0]. The output of the AND gate can be provided to a select clock select circuit. The select clock circuit can provide an input to a T flip-flop. The T flip-flop can then generate an indication of parity of the defined parity region 1.

The parity region circuit 124 can generate an indication of parity for the defined parity region 2 discussed above. For instance, as illustrated, the parity region circuit 124 can toggle its output each time a digit of the substring has a value of logic 1 and the second least significant counter output digit c11, c10 which is the dual rail encoded copy corresponding to COUNTER OUT[1] also has a value of logic 1.

The parity region circuit 126 can generate an indication of parity for the defined parity region 3 discussed above. For instance, as illustrated, the parity region circuit 126 can toggle its output each time a digit of the substring has a value of logic 1 and the third least significant counter output digit c21, c20 which is the dual rail encoded copy corresponding to COUNTER OUT[2] also has a value of logic 1.

The parity region circuit 128 can generate an indication of parity for the defined parity region 4 discussed above. For instance, as illustrated, the parity region circuit 128 can toggle its output each time a digit of the substring has a value of logic 1 and the fourth least significant counter output digit c31, c30 which is the dual rail encoded copy corresponding to COUNTER OUT[3] also has a value of logic 1.

Referring back to FIG. 1, the error correction circuit can also include an uncorrectable error detection circuit 160. The uncorrectable error detection circuit 160 can detect when there is an error in the substring that cannot be corrected by the error correction circuit 100. For instance, when the substring comprises a Hamming code with SECDEC data protection, an uncorrectable error can be detected when overall parity is even while some other parity in a defined region is odd. This can indicate that two errors are present in the substring and cannot be corrected by error correction codes. As illustrated, the uncorrectable error detection circuit 160 can receive an indication of overall parity of the substring from the overall parity circuit 129 and indications of parity in the defined regions from the other parity region circuits 122, 124, 126, and 128. Based on these received indications of parity, the uncorrectable error detection circuit 160 can detect whether a received substring includes an uncorrectable error.

The decoder 150 can receive the indications of parity of the defined regions of from the parity circuit 120. The decoder 150 can determine the location of one error in the substring based on the indications of parity of the defined regions of the substring. The parity digits of a substring can be generated such that each region has a specified parity (for example, an even parity). When one error is present in the substring, the decoder 150 can decode the location of the error in the substring based on the indications of parity corresponding to the erroneous digit having a different parity than the specified parity (for example, an odd parity). For instance, in the example corresponding to Table 1, there is a unique combination of parity digits providing parity coverage for each digit of the substring. Accordingly, corresponding parity information generated by the parity circuit can decoded by the decoder 150 to decode the location of a single error. In certain embodiments, the decoder 150 can be simplified such that it determines location of errors in data digits of the substring, without determining locations of errors in the parity digits of the substring. This can reduce the size of the decoder 150 in implementations in which errors in the parity digits need not be corrected.

The correction circuit 140 can receive the output of the decoder 150 and the data digits of the substring from the input register 130. Data digits can be provided to the correction circuit 140 when the input register 130 is full and when the output register 170 is empty. The correction circuit 140 can correct an error in the value of a data digit of the substring based on the decoder output. In response to detecting that the entire substring has been received, the correction circuit 140 can generate corrected data by correcting an error in one of the data digits of the substring based on the decoder output. As one example, a full substring being received can be detected based on one or more outputs of the counter circuit 110. The corrected data can include the corrected data digit and the other data digits of the substring. The output of the decoder 150 can uniquely identify the location of an error of the data digit of the substring for the correction circuit 140 to correct. As illustrated, the correction circuit 140 includes a multiplexer that can provide the value of each data digit stored in the input register 130 or the inverse value of the data digit to the output register 170. In the example correction circuit 140 of FIG. 1, an 11-bit multiplexer is included for an error correction circuit 100 configured to process a substring having 11 data bits. The decoder output can select the inverse value of the data digit where an error has been detected to correct the data digit. Then the correction circuit 140 can provide the corrected data to the output register 170. The input register 130 can be cleared in response to the correction circuit 140 transferring data to the output register 170. Then new digits from the digit stream can be automatically shifted into the input register 130 responsive the input register 130 being cleared.

The output register 170 can include parallel ports to receive the corrected data from the correction circuit 140. The output register 170 can be configured to store a number of data digits corresponding to the number of data digits in the substring. Accordingly, in the example error correction circuit 100 of FIG. 1, the output register is configured to store 11 bits of data. The output register 170 can be a shift register. The output register 170 can serially shift each data digit to a remote register 180. Since the output register and the remote register 180 can be physically remote from each other, a line routing 175 can add an RC delay between these registers. Similarly, the remote register 180 can shift the corrected data digits to the remote register 190 via line routing 185. The line routing 185 can add an RC delay between these registers. Such shifting can be repeated, for example, between remote register 190 and remote register 198 via line routing 195. Each of the remote registers 180, 190, and 198 can correspond to one bank of memory. STFB data can be converted into a 4-phase protocol for long distance transmissions of data. This can allow the use of repeater buffers. The data can be converted back into single track data for storage.

After error correction, data digits can be stored in remote registers, such as the remote registers 180, 190, and 198, for later use, such as provision to a host computer. Parity digits need not be saved to the remote registers after error correction according to certain embodiments. Data processing in the error correction circuit 100 can be well behaved due to the properties of asynchronous pipelines, which may accept new input data only when previous data has been fully consumed.

Figure 2:
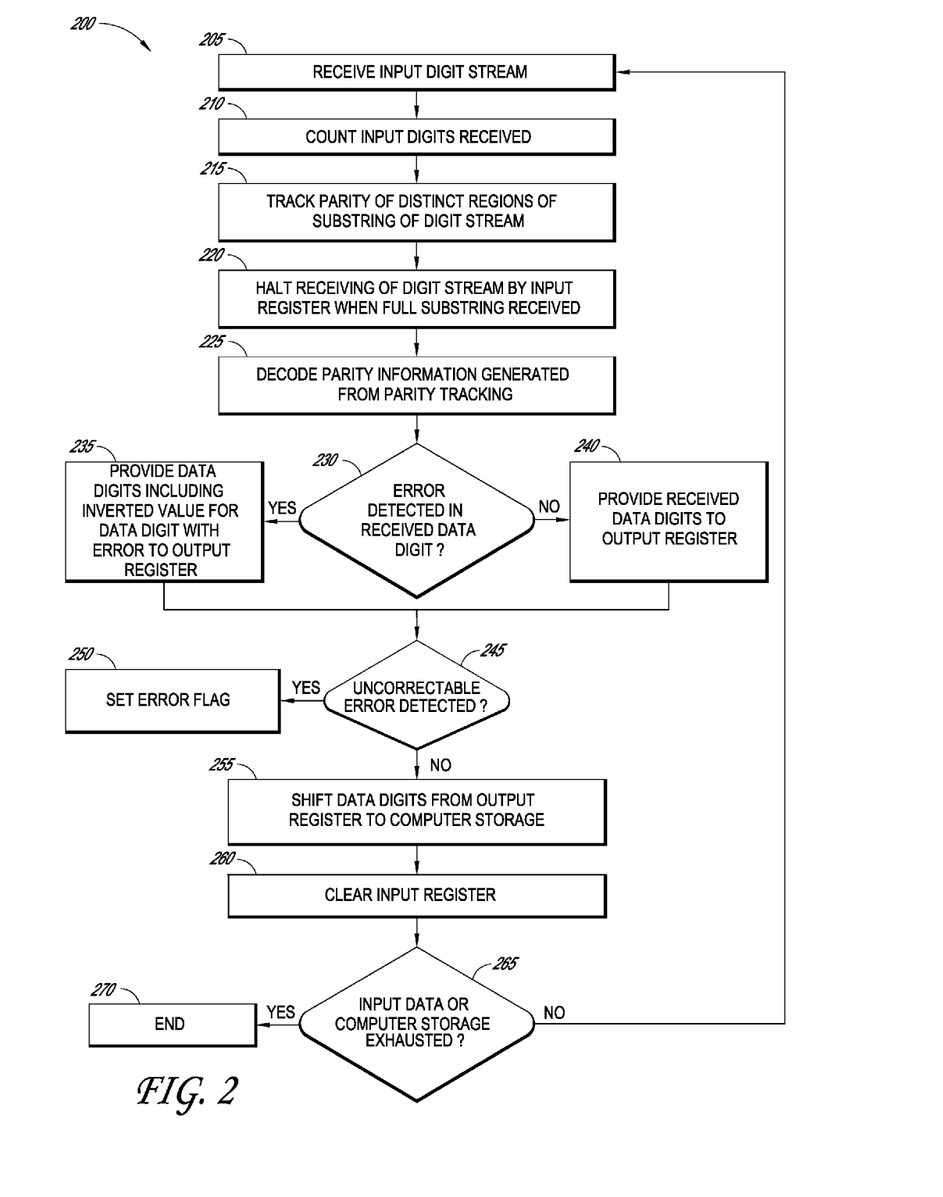
FIG. 2 is a flow diagram of an illustrative method of correcting errors in a digit stream according to an embodiment.

FIG. 2 is a flow diagram of an illustrative process 200 of correcting errors in a digit stream according to an embodiment. In the process 200, a digit stream can be received serially and errors in the received digit stream can be corrected using asynchronous circuitry. The process 200 can be implemented by the error correction circuit 100 according to certain embodiments. It will be understood that the process 200 can include greater or fewer operations than illustrated. Moreover, the operations of the process 200 can be performed in any order as appropriate.

At block 205, an input digit stream can be received. The digit stream can be received serially. The digit stream can comprise substrings of a predetermined length of digits, such as codewords, that include data digits and parity digits. The digit stream can be received from a memory, such as a dynamic random access memory (DRAM). The digit stream can include consecutive, non-overlapping substrings. The digit stream can be serially processed in an electronic pipeline. The electronic pipeline can be an asynchronous pipeline.

The received digits of the digit stream can be counted at block 210. A counter, such as the counter circuit 110 of FIG. 1 and/or FIG. 3, can increment each time a digit of the digit stream is received by an error correction circuit. Accordingly, the counter can keep track of the position of each received digit of the digit stream in a substring.

While the digits of the digit stream are being received, parity of defined regions of the substring can be tracked at block 215. A parity circuit, such as the parity circuit 120 of FIG. 1 and/or FIG. 4, can track parity in the defined regions. Parity can be incrementally generated for the defined regions of a substring when the pipeline is advanced. Parity can be tracked as each digit of the substring is received by the error correction circuit. Parity can be tracked based on values of the received digits that correspond to each defined region. The count of input digits received can provide information to determine which defined region each received digit corresponds to.

In response to detecting that a full substring is received, an input register can halt receiving digits of the substring at block 220. For example, the input register 130 of FIG. 1 can halt receiving digits of the digit stream as discussed above. Accordingly, a digit stream can be received serially and then an error in the digit stream can be corrected after the full substring has been received. At block 220, the counting at block 210 and/or the parity tracking at block 215 can also be halted. Accordingly, the counting and/or parity tracking can occur while the digit stream is being received.

The parity information generated by the parity tracking can be decoded at block 225. This can determine the location of an error in the substring. For example, the decoder 150 of FIG. 1 can be used to decode the parity information. In some embodiments, two or more errors can be detected by the decoding at block 225 and then be subsequently corrected.

When there is no error detected at decision block 230, the received data digits can be provided to an output register, such as the register 170 of FIG. 1, at block 240. When there is an error detected at decision block 230, corrected data can be provided to the output register at block 235. The corrected data can include a corrected data digit and the other data digits of the substring. In the case of binary data, the corrected data can be generated by providing an inverse value of the value of a data digit with the detected error. The corrected data can be generated responsive to detecting that the entire substring has been received. An error in one of the data digits of the substring can be corrected based on at least a portion of the parity information.

At decision block 245, whether an uncorrectable error is present in the data digits of the substring can be detected. This can detect, for example, when two errors are present in the substring and an error correction circuit is configured to correct a single error in the substring. For instance, when the substring is a Hamming code, the overall parity digit can be compared to the parity information of the defined regions. When the overall parity information generated by the parity tracking at block 215 does not match with the parity information for the defined regions such that parity computations corresponding to the defined regions indicates an error while the overall parity information does not indicate an error, two errors can be present in the substring.

When an uncorrectable error is detected at decision block 245, an error flag can be set at block 250. Then error correction can proceed with error handling routines for corrupt data. In some instances, this can include requesting the data again from the memory. When no uncorrectable error is detected at decision block 245, data digits can be transferred from the output register to computer storage. For instance, data digits can be serially shifted from the output register to other remote registers.

After the data digits have been provided to the output register, the input register can be cleared at block 260. The input register can be cleared in response to the data digits being provided to the output register. In certain embodiments, the input register can be cleared in response to the output register providing data digits to the computer storage.

At decision block 265, whether either the input digit stream has been exhausted or the computer storage is exhausted can be determined. If either of these conditions has been detected, the error correction process 200 can end. On the other hand, when more digits of the digit stream are received and there is more space to store data digits in computer memory, the process 200 can return to block 205. Other conditions can alternatively or additionally be checked to determine whether to continue receiving the digit stream.

Although some details of the methods and apparatuses discussed herein are provided in the context of ECC decoding, it will be understood that the principles and advantages discussed herein can be applied to ECC encoding. Asynchronous pipeline logic can be used to implement such ECC encoder functionality. For instance, the counter circuit 110 of FIG. 1 and/or FIG. 3 and the parity circuit 120 of FIG. 1 and/or FIG. 4 can be used to generate parity information for a digit stream of data digits. In one embodiment, the received data digits of the digit stream and the indications of parity generated by a parity circuit 120 can be combined to generate an error correction code in an ECC encoder. For instance, a digit stream of data digits can be received by a register. The register can store 11 data digits for a 16 digit hamming code. The data digits can be provided to parity region circuits, such as the parity region circuits discussed herein, to track a parity of defined regions of a substring of data digits of the digit stream. Parity digits can be generated such that each of the defined regions has a specified parity, such as an even parity or an odd parity. For example, if the data digits of a defined region have an even parity, then a binary parity digit associated with the defined region can be set to a logic 0 value so that the defined region and its associated parity digit have an even parity. In this example, if the data digits of a defined region have an odd parity, then a binary parity digit associated with the defined region can be set to a logic 1 value so that the defined region and its associated parity digits has an even parity. The same principles can be applied so that the defined region and its associated parity digit can have an odd parity. A counter circuit, such as the counter circuits discussed herein, can be used to generate the parity digits in accordance with the principles and advantages described herein.

In the embodiments described above, error correction circuitry can be implemented in any electronic device with a need for error correction. As such, the error correction circuits and methods described herein can be incorporated in various electronic devices. Examples of the electronic devices can include, but are not limited to, consumer electronic products, electronic circuits, electronic circuit components, parts of the consumer electronic products, electronic test equipment, etc. Examples of the consumer electronic products include, but are not limited to, a mobile phone, a telephone, a television, a computer monitor, a computer, a hand-held computer, a laptop computer, a tablet computer, a personal digital assistant (PDA), a microwave, a refrigerator, a stereo system, a cassette recorder or player, a DVD player, a CD player, a VCR, an MP3 player, a radio, a camcorder, an optical camera, a digital camera, a washer, a dryer, a washer/dryer, a copier, a facsimile machine, a scanner, a multi-function peripheral device, a wrist watch, a clock, etc. Further, the electronic device can include unfinished products. The disclosed techniques are not applicable to mental steps, and are not performed within the human mind or by a human writing on a piece of paper.

The foregoing description and claims may refer to elements or features as being "connected" or "coupled" together. As used herein, unless expressly stated to the contrary, "connected" means that one element/feature is directly or indirectly connected to another element/feature, and not necessarily mechanically. Likewise, unless expressly stated to the contrary, "coupled" means that one element/feature is directly or indirectly coupled to another element/feature, and not necessarily mechanically. Thus, although the drawings illustrate various examples of arrangements of elements and components, additional intervening elements, devices, features, or components may be present in an actual embodiment. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Any combination of the features of the methods described herein may be embodied in code stored in a non-transitory computer readable medium. When executed, the non-transitory computer readable medium may cause some or all of any of the methods described herein to be performed. It will be understood that any of the methods discussed herein may include greater or fewer operations and that the operations may be performed in any order, as appropriate. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times. Moreover, it will be understood that the methods discussed herein are performed at least partly by physical circuitry. Accordingly, the claims are not intended to cover purely metal processes or abstract ideas.

Various embodiments have been described above. Although described with reference to these specific embodiments, the descriptions are intended to be illustrative and are not intended to be limiting. Various modifications and applications may occur to those skilled in the art.

I claim:

1. An electronically-implemented method of correcting data in a digit stream, the method comprising:
   serially processing a digit stream in an electronic pipeline, the digit stream comprising substrings of a predetermined length of digits, each of the substrings comprising data digits and parity digits;
   incrementally generating parity information for defined regions of a substring of the digit stream as the pipeline is being advanced such that at least a portion of the parity information can be updated as each digit of the substring is processed; and
   responsive to detecting that the entire substring has been received, determining whether or not an error exists in the data digits of the substring; and
   if an error exists, generating corrected data by correcting the error in one of the data digits of the substring based on at least a portion of the parity information indicating where the error is present, the corrected data comprising the corrected data digit and the other data digits of the substring.

2. The method of claim 1, wherein the entire method is performed using asynchronous circuitry.

3. The method of claim 2, wherein the asynchronous circuitry comprises dual rail encoded signal lines.

4. The method of claim 1, wherein correcting the error comprises providing an inverse value of the one of the data digits.

5. The method of claim 1, wherein incrementally generating parity information further comprises generating parity information based at least partly on a value of a digit in the digit stream and on an output of a counter circuit.

6. The method of claim 5, wherein the defined regions of the substring each correspond to a respective output digit of the counter circuit.

7. The method of claim 5, wherein the counter circuit is an asynchronous counter circuit.

8. The method of claim 1, wherein incrementally generating parity information comprises tracking whether there is an even or odd number of digits having a particular value in each of the defined regions of the substring.

9. The method of claim 1, wherein the substring is received by a shift register.

10. The method of claim 9, further comprising prior to receiving new digits of the digit stream clearing the shift register in response to providing the corrected data to an output register.

11. The method of claim 1, wherein the parity digits comprise Hamming parity information.

12. An apparatus comprising:
    asynchronous circuitry comprising:
      an input register configured to serially receive a digit stream, the digit stream comprising substrings of a predetermined length of digits; and
      a parity circuit in a pipelined architecture, the parity circuit configured to determine parity of defined regions of a substring of the digit stream, and to generate indications of parity of the defined regions, wherein the parity circuit is configured to incrementally generate parity information each time the pipeline is advanced with new information from the digit stream such that the parity information can be updated corresponding to each digit of the substring being received by the input register.

13. The apparatus of claim 12, wherein each of the substrings comprise data digits and parity digits, the parity digital including an overall parity digit representing overall parity of a respective substring.

14. The apparatus of claim 13, further comprising:
    a decoder configured to receive at least a portion of the parity information and to provide an indication of whether an error exists in one of the data digits of the substring, and
    a correction circuit configured to correct the error in one of the data digits of the substring responsive to the indication of whether the error exists indicating that the error exists.

15. The apparatus of claim 14, wherein the asynchronous circuitry further comprises an output register configured to receive corrected data comprising the corrected data digit and the other data digits of the substring.

16. The apparatus of claim 15, wherein the input register is configured to be cleared in response to the output data register receiving the corrected data.

17. The apparatus of claim 13, wherein the defined regions correspond to regions for which a respective one of the parity digits of the substring provides parity information.

18. The apparatus of claim 13, wherein the asynchronous circuitry further comprises an uncorrectable error detection circuit configured to detect whether the substring includes an error that is uncorrectable by the asynchronous circuitry.

19. The apparatus of claim 12, wherein the input register is configured to halt receiving the digit stream in response to storing the entire substring.

20. The apparatus of claim 12, wherein the asynchronous circuitry comprises a counter circuit configured to update a counter output for each time a digit of the digit stream is received by the input register, wherein the counter output is configured to have a different value corresponding to each of the digits of the substring.

21. The apparatus of claim 20, wherein the parity circuit is configured to determine parity of at least one of the defined regions based on the counter output and values of a subset of the digits of the substring.

22. The apparatus of claim 12, wherein the asynchronous circuitry is configured to process dual rail encoded data.

23. The apparatus of claim 12, wherein the apparatus comprises an error correction codes encoder, and wherein the error correction codes encoder comprises the input register and the parity circuit.

24. The apparatus of claim 12, wherein the parity circuit is configured to serially receive digits of the digit stream.

25. An apparatus comprising:
 a counter circuit configured to update a counter output each time a bit of a bitstream is received by a shift register, the bitstream comprising substrings of a predetermined length of bits, wherein a value of the counter output is associated with how many bits of a selected substring have been received by the shift register, wherein the counter output comprises a plurality of output bits; and
 a parity circuit comprising:
  a plurality of parity region circuits of a first type, wherein each of the parity region circuits of a first type comprises a combinatorial logic gate and a first T flip-flop, wherein the combinatorial logic gate is configured to receive a selected output bit of the counter output and the bit of the bitstream as an input and to generate an output that is provided as a trigger input to the first T flip-flip; and
  a parity region circuit of a second type comprising a second T flip-flop, wherein the input of the parity region circuit of the second type is configured to receive the bit of the bitstream as an input.

26. The apparatus of claim 25, wherein each of the substrings comprise data bits and parity bits.

27. The apparatus of claim 26, further comprising:
 a decoder configured to receive outputs of parity circuits of the first type and to provide an indication of whether an error exists in one of the data bits of the selected substring; and
 a correction circuit configured to correct the error responsive to the indication of whether the error exists indicating that the error exists.

28. The apparatus of claim 26, wherein the defined regions of the substring correspond to regions for which parity bits of the substring provide parity information.

29. The apparatus of claim 25, further comprising the shift register configured to store the selected substring, wherein the shift register is configured to serially receive the digit stream.

30. The apparatus of claim 25, wherein the apparatus comprises asynchronous circuitry, the asynchronous circuitry comprising the counter circuit and the parity circuit.

31. The apparatus of claim 30, wherein the asynchronous circuitry comprises Single-Track Full Buffer circuitry.

32. The apparatus of claim 25, wherein the combinatorial logic gate comprises an AND gate.

* * * * *